(No Model.)

E. E. KELLER.
CUTTER AND GRATER COMBINED.

No. 593,052. Patented Nov. 2, 1897.

Witnesses:
J. M. Fowler Jr.
Walter Payne

Inventor:
Emanuel E. Keller
by Theodor Mungen.
Attorney

UNITED STATES PATENT OFFICE.

EMANUEL E. KELLER, OF YORK, PENNSYLVANIA.

CUTTER AND GRATER COMBINED.

SPECIFICATION forming part of Letters Patent No. 593,052, dated November 2, 1897.

Application filed July 17, 1897. Serial No. 644,880. (No model.)

*To all whom it may concern:*

Be it known that I, EMANUEL E. KELLER, a citizen of the United States, residing at York, in the county of York and State of Pennsylvania, have invented certain new and useful Improvements in a Cutter and Grater Combined; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to cutters and graters combined, and is especially designed for treating green corn in the ear form in such manner as to remove the grains from the cob with great ease and facility, and at the same time to add to the marketable value of the product the maximum possibilities, thereby giving to the consumer the full benefits of the article, and also enabling the producer to derive a legitimate profit therefrom; and the invention consists in the construction and novel combination of the parts of the device, as will be hereinafter fully described and claimed.

Figure 1:
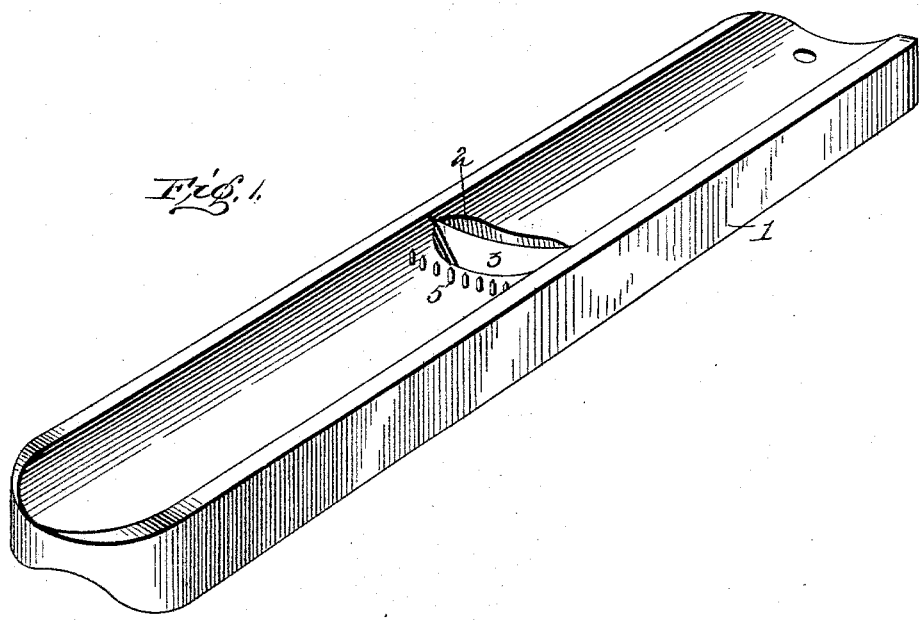
Figure 2:
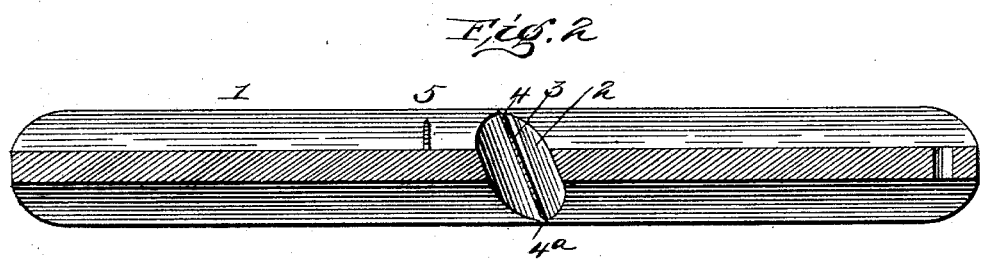
Figure 3:
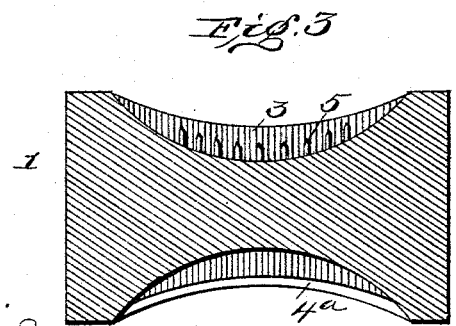

In the drawings, Figure 1 is a view in perspective of the combined cutter and grater, embodying the improvements of my invention. Fig. 2 is a vertical longitudinal sectional view of the concavo-concave cutter-blade made integral and seated in the stock of the implement. Fig. 3 is a transverse vertical sectional view through the stock immediately in front of the cutter-blade and grater, showing the concaved knife-edges and the grater-teeth.

Referring by numeral to the accompanying drawings, 1 designates the stock of the combined cutter and grater, which may be made of any suitable material, and is concavo-concave in outline in cross-section, so that a portion of the ear of corn to be treated may be reciprocated in either of the grooves of the cutter and grater at the proper time or at the will of the operator. About midway of its length the stock 1 of the implement is provided with a throat 2, after the manner of the throat of a joiner's plane, but not precisely similar in outline or dimensions. Within this throat 2 of the stock 1 is removably seated the cutter-blade 3, which is made concave in both of its edges and is provided with knife-edges 4 and 4ª to cut the kernels of corn from the cob. The cutter is seated in grooves at the sides of the throat 2 and is made removable in order to sharpen it. One edge of the cutter and grater blade is serrated or provided with teeth 5, which are designed to serve as grating-teeth to correspond as nearly as possible with the intervals between the rows of grains on the ear.

Slightly to one side of the throat 2 of the stock 1 a row of transversely-disposed grater-teeth 5 are provided and are arranged as nearly as possible to correspond with the intervals between the rows of grains on the ear of corn, and are designed to open and detach the sacs in which the kernels of corn are contained on the cob.

As the ear of corn is reciprocated over the blade in the groove the kernels of corn are detached from the cob and fall through the throat of the implement into any suitable receptacle provided therefor. The teeth 5, when presented to the partially-dressed cob, will loosen the portions of the kernels remaining in the sacs of the ear of corn and will remove them from the cob also.

The grater can be used for various kinds of vegetables where it may be necessary to grate them, so that the implement, although exceedingly simple, is possessed of great utility.

Having thus fully described my invention, what I claim as new, and desire to secure by Letters Patent, is—

1. The reversible combined cutter and grater, herein described, comprising the stock having the concavo-concave opposing faces extending throughout the length of the stock, the centrally-disposed transverse throat formed in the same, and the cutter-blade seated transversely of the throat of the stock and having the concave cutting-knife and the toothed grater arranged transversely of the throat of the stock, as set forth.

2. A reversible combined cutter and grater for vegetables, comprising a stock-piece having a throat and concavo-concave guiding-surfaces, of a concavo-concave cutter and grater removably seated in the throat of the stock, substantially as set forth.

In testimony whereof I affix my signature in presence of two witnesses.

EMANUEL E. KELLER.

Witnesses:
C. J. KELLER,
N. R. CROSS.